United States Patent [19]

Voland

[11] Patent Number: 4,965,701
[45] Date of Patent: Oct. 23, 1990

[54] ILLUMINATION CURTAIN KIT APPARATUS

[76] Inventor: Nora H. B. Voland, 1609 8th St., N.E. Apt. 307, Auburn, Wash. 98002

[21] Appl. No.: 475,411

[22] Filed: Feb. 5, 1990

[51] Int. Cl.⁵ .............................................. F21V 7/04
[52] U.S. Cl. ..................................... 362/32; 362/238; 362/252; 362/806
[58] Field of Search .................. 362/237, 238, 32, 252, 362/391, 806, 807, 236

[56] References Cited

U.S. PATENT DOCUMENTS

| 2,298,089 | 10/1942 | Veenboer | 362/806 |
| 3,036,206 | 5/1962 | Holbrook | 362/806 |
| 4,854,214 | 8/1989 | Lowe | 362/806 |

Primary Examiner—Carroll B. Dority
Attorney, Agent, or Firm—Leon Gilden

[57] ABSTRACT

An illumination curtain is provided wherein a support housing includes a spaced series of downwardly descending tubular members receiving therewithin electrical transmission line in communication with spaced illumination bulbs mounted within translucent spheres. The translucent spheres are mounted onto the tubing members at spaced intervals therealong. The kit apparatus includes various configurations for mounting about the tubular members, such as pyramids, cubes, and the like. A modification of the instant invention includes the translucent members mounted to the tubing members encasing a circuitous fiber optic cable with a rear terminal end of the cable aligned with an opening of an egg-shaped housing containing an illumination bulb therewithin to provide an enhanced visual effect of the curtain kit apparatus.

6 Claims, 4 Drawing Sheets

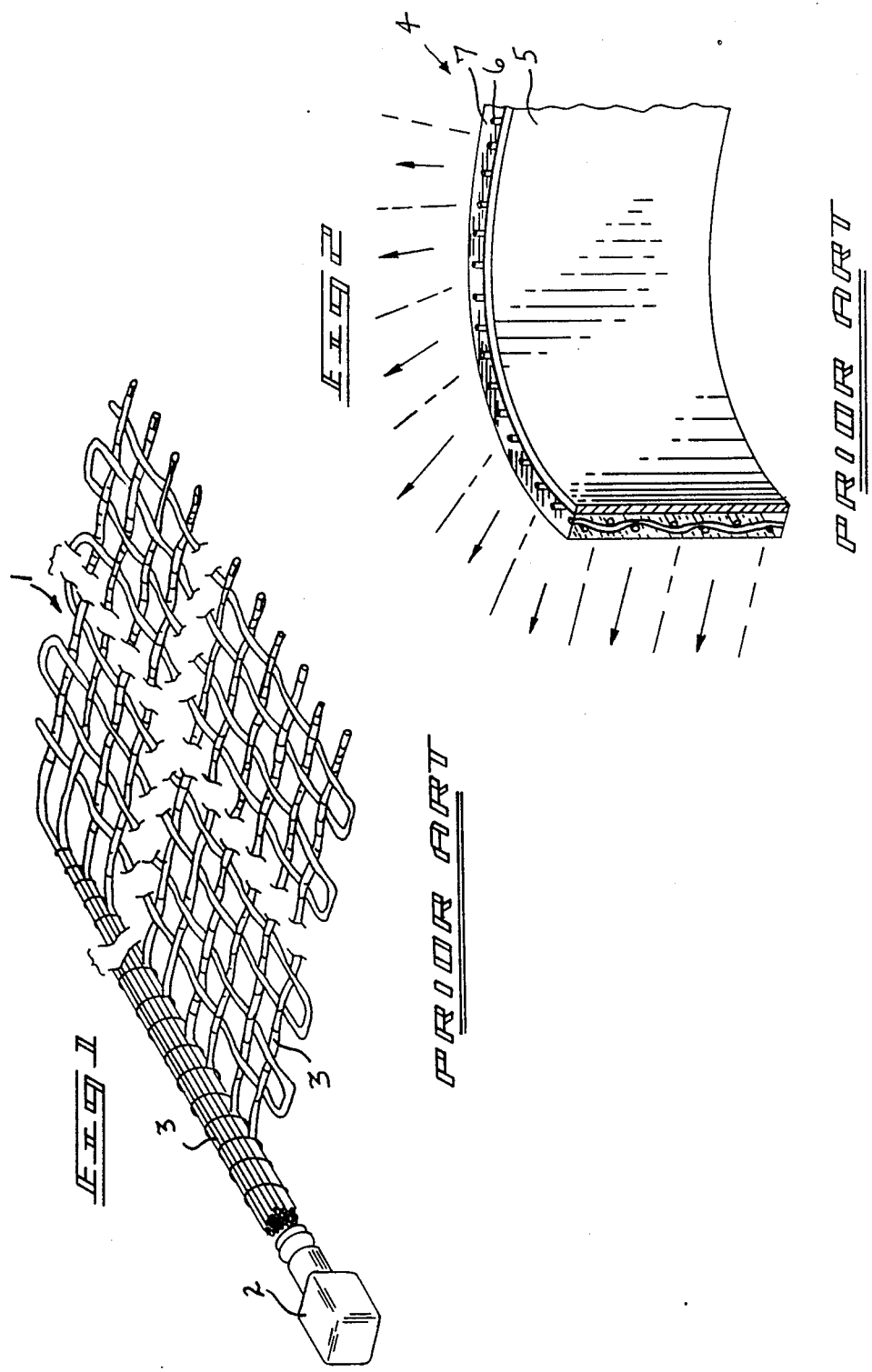

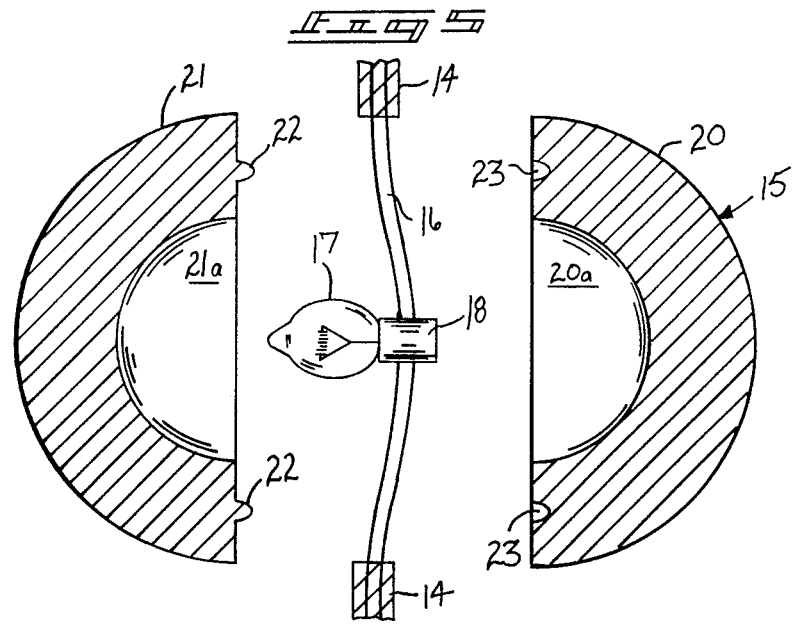
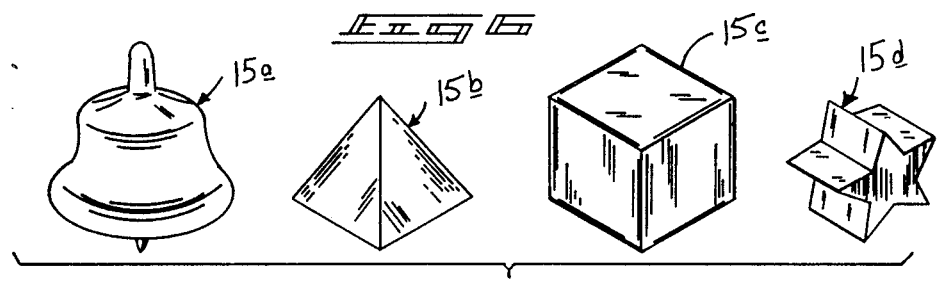
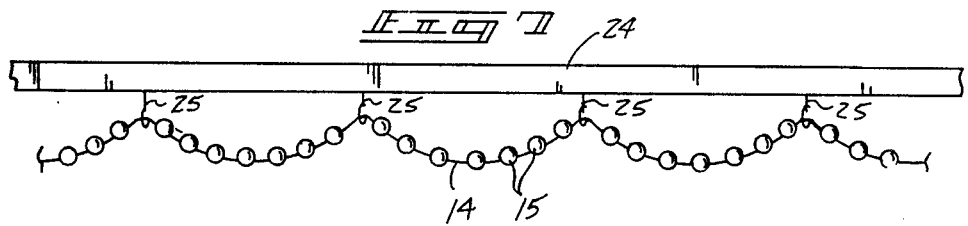

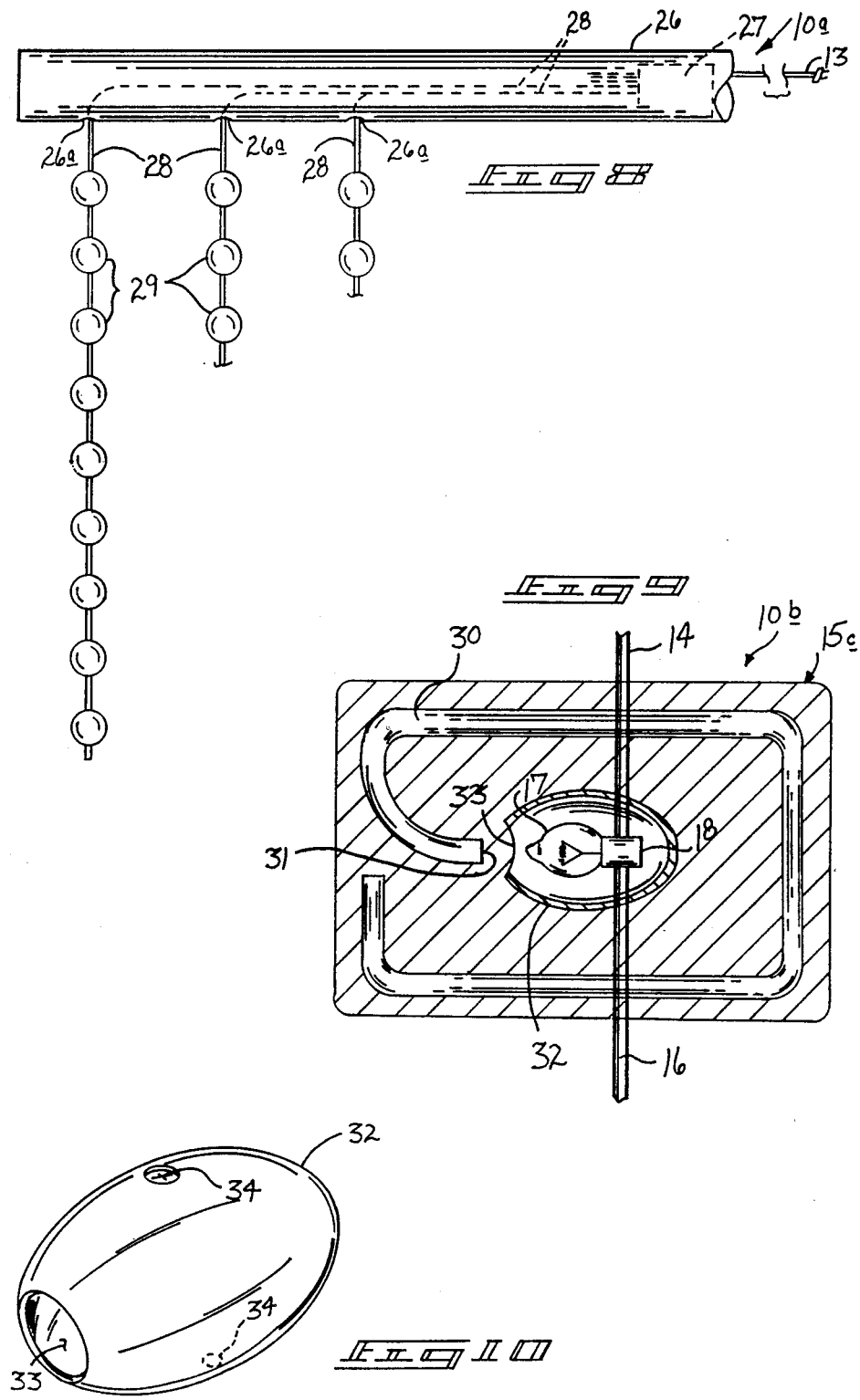

ILLUMINATION CURTAIN KIT APPARATUS

BACKGROUND OF THE INVENTION

1. Field of the Invention

The field of invention relates to illumination curtains, and more particularly pertains to a new and improved illumination curtain kit apparatus wherein the same provides for an illumination curtain for enhanced visual effect within a dwelling or enclosure.

2. Description of the Prior Art

Various display panels for use interiorly of dwellings and the like are utilized for providing divider members within various rooms to separate such rooms, and further provide an enhanced visual effect within such enclosures. Illumination panels utilized in the prior art may be found as examples in Kemeny U.S. Pat. No. 4,722,146 illustrating interior panel units of vertically aligned panels which may be illuminated.

Jamison U.S. Pat. No. 4,667,833 sets forth a knock-down structure for use in support of various pictures and the like mounted on the structure and provided with overlying illumination means to direct light on the underlying panels.

Small, et al., U.S. Pat. No. 4,573,513 sets forth a modular panel construction wherein the panels are secured to one another by a tongue and groove arrangement, and also provided with lighting means mounted overlying the panels to direct light onto the panels for illumination thereof.

Coulthard U.S. Pat. No. 4,001,987 sets forth a divider screen construction that includes panels pivotally mounted relative to one another for enclosure of a projector to project images onto the panels by use of a reflective mirror.

Daniel U.S. Pat. No. 4,234,907 provides a light emitting fabric comprised of a matrix of interwoven optical fibers to provide a visual effect through the matrix.

As such, it may be appreciated that there is a continuing need for a new and improved illumination curtain kit apparatus which addresses both the problems of ease of use and effectiveness in construction in providing a projection of an illumination curtain and in this respect, the present invention substantially fulfills this need.

SUMMARY OF THE INVENTION

In view of the foregoing disadvantages inherent in the known types of illumination panels now present in the prior art, the present invention provides an illumination curtain kit apparatus wherein the same provides an apparatus for the illumination of divider curtains and the like for use interiorly of a dwelling. As such, the general purpose of the present invention, which will be described subsequently in greater detail, is to provide a new and improved illumination curtain kit apparatus which has all the advantages of the prior art illumination panel constructions and none of the disadvantages.

To attain this, the present invention includes an illumination curtain provided with a support housing including a spaced series of downwardly descending tubular members receiving therewithin electrical transmission line in communication with spaced illumination bulbs mounted within translucent spheres. The translucent spheres are mounted onto the tubing members at spaced intervals therealong. The kit apparatus includes various configurations for mounting about the tubular members, such as pyramids, cubes, and the like. A modification of the instant invention includes the translucent members mounted to the tubing members encasing a circuitous fiber optic cable with a rear terminal end of the cable aligned with an opening of an egg-shaped housing containing an illumination bulb therewithin to provide an enhanced visual effect of the curtain kit apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illumination curtain kit apparatus which has all the advantages of the prior art illumination panel constructions and none of the disadvantages.

It is another object of the present invention to provide a new and improved illumination curtain kit apparatus which may be easily and efficiently manufactured and marketed.

It is a further object of the present invention to provide a new and improved illumination curtain kit apparatus which is of a durable and reliable construction.

An even further object of the present invention is to provide a new and improved illumination curtain kit apparatus which is susceptible of a low cost of manufacture with regard to both materials and labor, and which accordingly is then susceptible of low prices of sale to the consuming public, thereby making such illumination curtain kit apparatus economically available to the buying public.

Still yet another object of the present invention is to provide a new and improved illumination curtain kit apparatus which provides in the apparatuses and methods of the prior art some of the advantages thereof, while simultaneously overcoming some of the disadvantages normally associated therewith.

Still another object of the present invention is to provide a new and improved illumination curtain kit apparatus wherein the same provides an easily mounted and effective illumination curtain for use as a divider wall and the like within various dwellings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art illumination fabric.

FIG. 2 is an isometric illustration, partially in section, of a prior art illumination fabric.

FIG. 5 is an orthographic view, somewhat exploded, of the illumination sphere, as illustrated in FIG. 4.

FIG. 6 is an isometric illustration of various modifications of illumination members utilized in lieu of the illumination sphere of the instant invention.

FIG. 7 is an orthographic view taken in elevation of the instant invention secured to a sealing structure.

FIG. 8 is an orthographic view taken in elevation illustrating a modification of the instant invention.

FIG. 9 is an orthographic cross-sectional view of a modified illumination member utilized by the instant invention.

FIG. 10 is an isometric illustration of the housing utilized by the illumination member in FIG. 9.

DESCRIPTION OF THE PREFERRED EMBODIMENT

Figure 3:
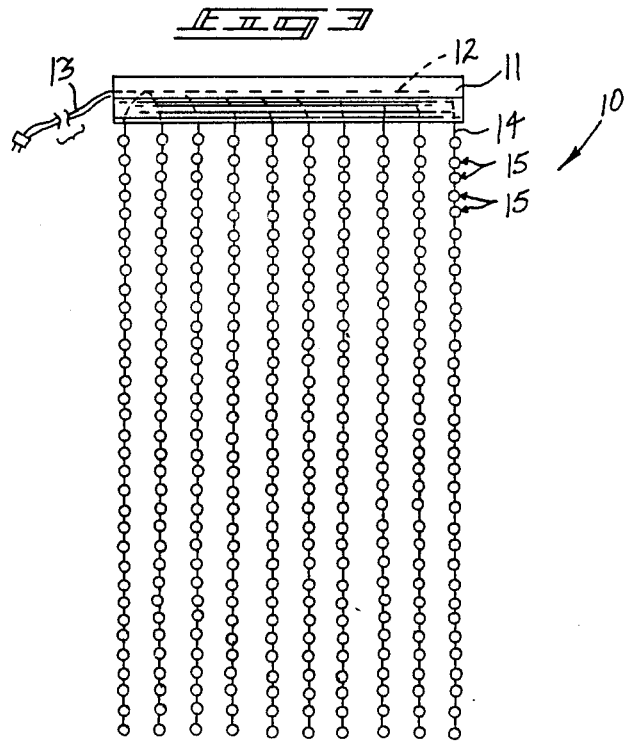
FIG. 3 is an orthographic side view taken in elevation of the instant invention.

With reference now to the drawings, and in particular to FIGS. 1 to 10 thereof, a new and improved illumination curtain kit apparatus embodying the principles and concepts of the present invention and generally designated by the reference numerals 10, 10a, and 10b will be described.

FIG. 1 is illustrative of a prior art fabric member 1 cooperative with an illumination source 2 to direct illumination through a matrix of optical cables 3 forming the fabric. FIG. 2 is illustrative of the fabric of FIG. 1 utilized within a panel construction 4, wherein an opaque backing 5 mounts the matrix of cables 6 that provide directed light through the forwardly positioned sheet member 7 encasing the various cables 6 therewithin.

Figure 4:
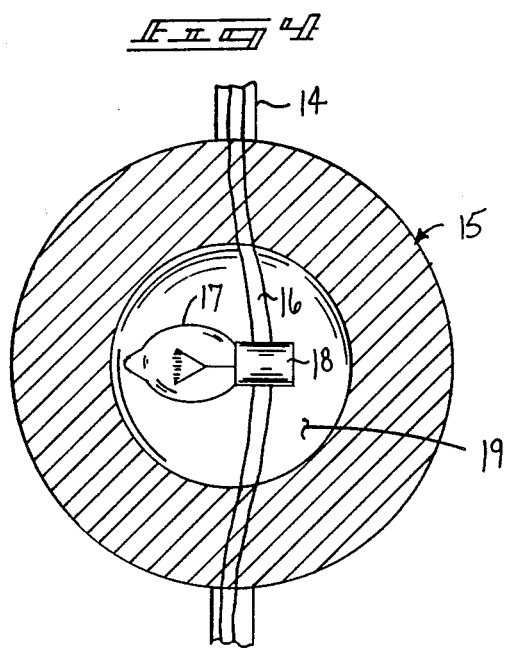
FIG. 4 is an orthographic cross-sectional view of an illumination sphere utilized by the instant invention.

Mores specifically, the illumination curtain kit apparatus 10 essentially comprises a horizontal support housing 11 including electrical communication wires 12 in upper association with an electrical connector 13, wherein the wires 12 are in electrical communication through flexible tubing members 14 oriented orthogonally and descending downwardly from the horizontal housing 11. The flexible tubing members 14 define an array of equally spaced tubing members with illumination spheres 15 mounted at spaced intervals along each of the tubing members 14. The tubing members 14 each contain a separate continuous electrical wire member 16 that is electrically associated with an electrical socket 18 and an associated illumination bulb 17. The illumination bulb 17, upon illumination thereof, is visible exteriorly of each illumination sphere 15, as each illumination sphere 15 is formed of a translucent material. Each sphere 15 is formed with a central spherical cavity 19. Reference to FIG. 5 illustrates the sphere 15 formed with a first semi-spherical member 20 and a second semi-spherical member 21 securable together in a snapped fit relationship, with a plurality of diametrically spaced projections 22 securably received within aligned diametrically spaced openings 23 formed within a forward surface of the first semi-spherical member 20 to receive the projections 22. Each of the spheres includes a respective semi-spherical cavity 20a and 21a respectively to form the spherical cavity 19 when the illumination sphere 15 is in a unitary configuration, as illustrated in FIG. 4 for example. FIG. 6 is illustrative of a variety of modified illumination members defining a bell 15a, a pyramid 15b, a cube 15c, and a star 15d that are replaceably mounted in substitution for the sphere 15 within the kit apparatus 10 per FIG. 3.

FIG. 7 is illustrative of the kit apparatus 10 mounted to a ceiling 24 utilizing aligned hook members 25 to suspend each of the tubing members 14 in a desired array adjacent the ceiling 24.

FIG. 8 is illustrative of a modified curtain kit apparatus 10 wherein a hollow support rod 26 includes an illumination member 27 therewithin in operative association with electrical connector 13. A fiber optic cable bundle directs illumination from the illumination member 27 through individual fiber optic cables 28, wherein each fiber optic cable is directed exteriorly and downwardly of the rod 26 through aligned apertures 26a formed at equally spaced intervals through a bottom surface of the rod 26. Translucent solid spheres 29 are mounted at spaced intervals along each of the fiber optic cables 28 to enhance illumination effect from the fiber optic cables in the matrix defining the curtain by the fiber optic cables 28, which are understood to be of substantially an equal length in providing a curtain assembly for use as a room divider and the like within a dwelling.

FIG. 9 is illustrative of a modified illumination member 10b wherein the cube 15c includes a circuitous fiber optic cable 30 wound throughout the cube 15c, with an egg shaped housing 32 mounted medially of the cube 15c. The egg shaped housing 32 encloses an illumination bulb 17 mounted within the socket 18 in communication with electrical wiring mounted within the associated flexible tubing member 14 defining the array of FIG. 3 for example. The egg shaped housing 32 is of an opaque construction formed with a housing opening 33 directed to the egg shaped housing 32 at a forward terminal end thereof. A rear terminal end of the fiber optic cable 30 is axially aligned with the housing opening 33 and the associated illumination bulb 17 to direct a circuitous light through the fiber optic cable 30 for optical transmission through the associated translucent tube 15c. The egg shaped housing 32, as illustrated in FIG. 10, is provided with upper and lower aligned wire receiving openings 34 to receive the tubing member 14 and an associated electrical wire member 16 therethrough.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illumination curtain kit apparatus comprising, in combination,
    an elongate horizontal support housing including an aligned series of openings formed through a bottom surface of the housing, and
    a series of equally spaced, flexible members suspended downwardly through the openings, and
    a series of equally spaced translucent illumination members symmetrically and surroundingly mounting portions of the flexible member, and
    illumination means mounted within each illumination member to direct light therethrough.

2. An apparatus as set forth in claim 1 wherein the flexible members comprise flexible tubular members, and an electrical transmission line is directed through each tubular member, and each of the electrical transmission lines are directed upwardly into the support housing, wherein each of the electrical transmission lines are associated with an electrical connector to direct electrical energy throughout the electrical transmission lines, and each of the electrical transmission lines are directed through each of the illumination members in association with the illumination means.

3. An apparatus as set forth in claim 2 wherein each of the illumination means comprises an illumination bulb, and each illumination member includes a central cavity mounting each of the bulbs therewithin.

4. An apparatus as set forth in claim 3 wherein each bulb member is mounted within an egg shaped housing, and the egg shaped housing includes an opening mounted through a forward end thereof, wherein the bulb is in axial alignment with the opening, and the illumination member including a circuitous fiber optic cable encased and mounted within the illumination member, with a rear terminal end of the fiber optic cable in axial alignment with the opening of the egg shaped housing and the bulb.

5. An apparatus as set forth in claim 4 wherein a series of further illumination members are provided replaceably mounted to each flexible member.

6. An apparatus as set forth in claim 5 wherein each egg shaped housing includes an upper opening aligned with a lower opening for reception and directing of an electrical transmission wire therethrough.

* * * * *